United States Patent [19]
Harbin

[11] Patent Number: 5,411,284
[45] Date of Patent: May 2, 1995

[54] TILT TRAILER STABILIZER APPARATUS

[76] Inventor: Kenneth L. Harbin, Rte. 1, Box 24-A, Scobey, Miss. 38953

[21] Appl. No.: 209,216

[22] Filed: Mar. 11, 1994

[51] Int. Cl.$^6$ .............................................. B60D 1/14
[52] U.S. Cl. ......................................... 280/656; 298/5; 298/17 R; 414/483
[58] Field of Search ................. 280/477, 656, 789; 298/5, 12, 14, 17 R, 17 S, 17 T, 17 B; 414/477, 482, 483, 484

[56] References Cited

U.S. PATENT DOCUMENTS

| | | | |
|---|---|---|---|
| 2,724,612 | 11/1955 | Linneman | 298/17 R |
| 2,992,750 | 7/1961 | Brock | 414/483 |
| 3,690,490 | 9/1972 | Hall | 214/506 |
| 3,731,974 | 5/1973 | Stafford, Jr. | 298/17 R |
| 3,807,593 | 4/1974 | Bourton | 298/5 |
| 3,833,263 | 9/1974 | Jackson | 298/5 |
| 3,901,397 | 8/1975 | Brock | 214/392 |
| 4,394,105 | 7/1983 | Mitchell | 414/436 |
| 4,813,841 | 3/1989 | Eischen | 298/12 X |
| 4,872,728 | 10/1989 | Adams | 298/17 R X |
| 5,080,548 | 1/1992 | Bratlie et al. | 414/385 |

Primary Examiner—Margaret A. Focarino
Assistant Examiner—Victor E. Johnson

[57] ABSTRACT

A new and improved tilt trailer stabilizer apparatus includes a first bracket assembly which is connected to a first edge of a tiltable bed assembly of a tilt trailer. A second bracket assembly is connected to a frame assembly of the tilt trailer. A brake assembly is connected between the first bracket assembly and the second bracket assembly for slowing relative motion between the tiltable bed assembly and the frame assembly when the tiltable bed assembly is moved from a horizontal orientation to a tilted orientation and vice versa. The first bracket assembly includes a first hinge assembly for connecting to a first end of the brake assembly, and the second bracket assembly includes a second hinge assembly for connecting to a second end of the brake assembly. The brake assembly includes a fluid-based, motion damping assembly. A lock assembly is provided for locking the tiltable bed assembly to the frame assembly when the tiltable bed assembly is in a horizontal orientation. The lock assembly includes a first lock member connected to the tiltable bed assembly. A second lock member is connected to the frame assembly, such that the first lock member is placed in registration with the second lock member when the tiltable bed assembly is in a horizontal orientation. A lock pin is provided for securing the first lock member to the second lock member when the first lock member and the second lock member arc placed in registration.

4 Claims, 4 Drawing Sheets

TILT TRAILER STABILIZER APPARATUS

BACKGROUND OF THE INVENTION

1. Field of the Invention

The present invention relates generally to small utility trailers and, more particularly, to small utility trailers that are capable of tilting to load and unload equipment carried by the trailers.

2. Description of the Prior Art

Small utility trailers are popular devices for hauling small machines such as golf carts, lawn mowers, and motorcycles, among other machinery. For convenience, the beds of many small utility trailers tilt back to facilitate loading and unloading of the trailer. A problem, however, is associated with the tilting trailers. When the machinery is loaded onto the tilted trailer, after the machinery goes past the tilt fulcrum, the bed of the tilt trailer may rapidly slam from the tilted to the horizontal orientation. The rapidly slamming trailer bed when it moves from a tilted position to a horizontal position may be unsafe to the machinery, to the trailer, and to personnel. In this respect, it would be desirable if a device were provided for small tilt trailers that prevented a rapid slamming of a trailer bed when it moves from a tilted to a horizontal position. Conversely, a trailer bed may rapidly slam when it moves from a horizontal to a tilted position when the trailer is unloaded. Similarly, the rapidly slamming trailer bed may be unsafe to machinery, to the trailer, and to personnel. In this respect, it would be desirable if a device were provided for small tilt trailers that prevented a rapid slamming of a trailer bed when it moves from a horizontal to a tilted position.

There are many small utility trailers that are currently in use that are not equipped with devices for reducing rapid slamming described above. In this respect, it would be desirable if a device were provided for small tilt trailers that facilitated retrofitting of present utility trailers with devices for eliminating rapid slamming.

For convenience and for keeping retrofitting costs low, it would be desirable if the devices used for retrofitting small utility trailers to eliminate rapid slamming were readily available and relatively inexpensive.

Throughout the years, a number of innovations have been developed relating to small utility trailers, and the following U.S. patents are representative of some of those innovations: U.S. Pat. Nos. 3,690,490; 3,833,263; 3,901,397; and 4,394,105. None of the above cited patents provide a device for eliminating rapid slamming as described above.

The following U.S. patent may also be of interest. U.S. Pat. No. 5,080,548 discloses a device for securing a truck trailer thereto and tilting the device so that contents of the truck trailer are dumped. The tilting is carried out by hydraulically powered cylinders.

Small utility trailers described above are not hydraulically powered. Providing hydraulic power for tilting on a small utility trailer would be unnecessarily complex and expensive, especially for retrofitting trailers currently in use. In this respect, it would be desirable if a device were provided for small tilt trailers which eliminates rapid trailer bed slamming without using hydraulically powered devices.

Still other features would be desirable in a tilt trailer device that prevents the trailer bed from slamming rapidly. For example, a small utility trailer is often loaded and unloaded by a single person. In this respect, it would be desirable if a device were provided for small tilt trailers that prevents rapid trailer bed slamming and permits a single person to load and unload a trailer.

Thus, while the foregoing body of prior art indicates it to be well known to use small utility tilt trailers, the prior art described above does not teach or suggest a tilt trailer stabilizer apparatus which has the following combination of desirable features: (1) prevents a rapid slamming of a trailer bed when it moves from a tilted to a horizontal position; (2) prevents a rapid slamming of a trailer bed when it moves from a horizontal to a tilted position; (3) facilitates retrofitting of present tilting utility trailers with devices for eliminating rapid slamming; (4) employs devices for retrofitting small utility trailers which are readily available and relatively inexpensive; (5) eliminates rapid trailer bed slamming without using hydraulically powered devices; and (6) prevents rapid trailer bed slamming and permits a single person to load and unload a trailer. The foregoing desired characteristics are provided by the unique tilt trailer stabilizer apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved tilt trailer stabilizer apparatus for a tilt trailer assembly which includes a tiltable bed assembly which is capable of being placed in a horizontal orientation or in a tilted orientation. The tilt trailer assembly also includes a frame assembly that supports the tiltable bed assembly. The tilt trailer stabilizer apparatus includes a first bracket assembly which is connected to a first edge of the tiltable bed assembly. A second bracket assembly is connected to the frame assembly. A brake assembly is connected between the first bracket assembly and the second bracket assembly for slowing relative motion between the tiltable bed assembly and the frame assembly when the tiltable bed assembly is moved from a horizontal orientation to a tilted orientation and for slowing relative motion between the tiltable bed assembly and the frame assembly when the tiltable bed assembly is moved from a tilted orientation to a horizontal orientation.

The first bracket assembly includes a first hinge assembly for connecting to a first end of the brake assembly, and the second bracket assembly includes a second hinge assembly for connecting to a second end of the brake assembly. The first hinge assembly includes a pair of first hinge apertures and a first hinge pin. The second hinge assembly includes a pair of second hinge apertures and a second hinge pin. The brake assembly includes a fluid-based, motion damping assembly.

A lock assembly is provided for locking the tiltable bed assembly to the frame assembly when the tiltable bed assembly is in a horizontal orientation. The lock assembly includes a first lock member connected to the tiltable bed assembly. A second lock member is connected to the frame assembly, such that the first lock member is placed in registration with the second lock member when the tillable bed assembly is in a horizontal orientation. A lock pin is provided for securing the first lock member to the second lock member when the first lock member and the second lock member are placed in registration.

The first lock member is located on the first bracket assembly, and the first bracket assembly is nested between a pair of second lock members supported by the frame assembly when the tiltable bed assembly is in a horizontal orientation. The first lock member includes a pair of first apertures located on the first bracket assembly. The second lock member includes a pair of second apertures that are placed in registration with the first apertures when the tillable bed assembly is in a horizontal orientation. The lock pin is positioned through the first apertures and the second apertures when the tillable bed assembly is in a horizontal orientation, whereby the tiltable bed assembly is locked in the horizontal orientation.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved tilt trailer stabilizer apparatus which has all of the advantages of the prior art and none of the disadvantages.

It is another object of the present invention to provide a new and improved tilt trailer stabilizer apparatus which may be easily and efficiently manufactured and marketed.

It is a further object of the present invention to provide a new and improved tilt trailer stabilizer apparatus which is of durable and reliable construction.

An even further object of the present invention is to provide a new and improved tilt trailer stabilizer apparatus which is susceptible of a low cost of manufacture with regard to both materials and labor, and which accordingly is then susceptible of low prices of sale to the consuming public, thereby making such tilt trailer stabilizer apparatus available to the buying public.

Still yet a further object of the present invention is to provide a new and improved tilt trailer stabilizer apparatus which prevents a rapid slamming of a trailer bed when it moves from a tilted to a horizontal position.

Still another object of the present invention is to provide a new and improved tilt trailer stabilizer apparatus that prevents a rapid slamming of a trailer bed when it moves from a horizontal to a tilted position.

Yet another object of the present invention is to provide a new and improved tilt trailer stabilizer apparatus which facilitates retrofitting of present tilting utility trailers with devices for eliminating rapid slamming.

Even another object of the present invention is to provide a new and improved tilt trailer stabilizer apparatus that employs devices for retrofitting small utility trailers which are readily available and relatively inexpensive.

Still a further object of the present invention is to provide a new and improved tilt trailer stabilizer apparatus which eliminates rapid trailer bed slamming without using hydraulically powered devices.

Yet another object of the present invention is to provide a new and improved tilt trailer stabilizer apparatus that prevents rapid trailer bed slamming and permits a single person to load and unload a trailer.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved tilt trailer stabilizer apparatus embodying the principles and concepts of the present invention will be described.

Figure 1:
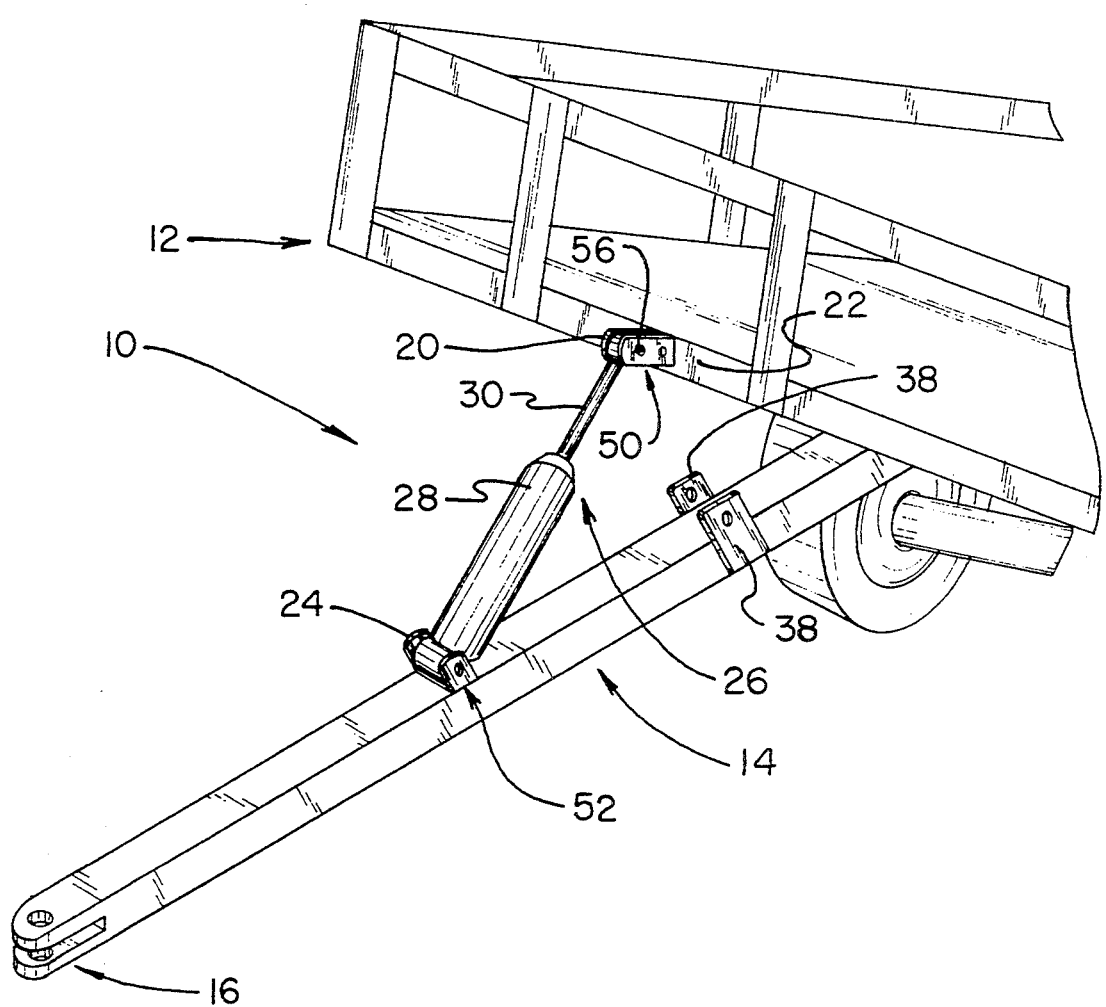
FIG. 1 is a perspective view showing a preferred embodiment of the tilt trailer stabilizer apparatus of the invention in use on a small utility trailer that is in a tilted orientation.
Figure 3:
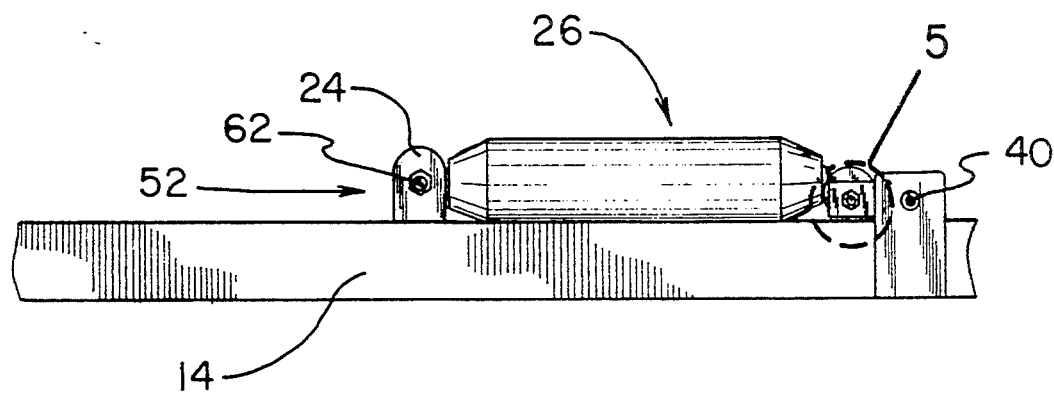
FIG. 3 is a side view of the embodiment of the tilt trailer stabilizer apparatus of FIGS. 1 and 2 wherein the trailer has been moved from a tilted to a horizontal orientation.
Figure 2:
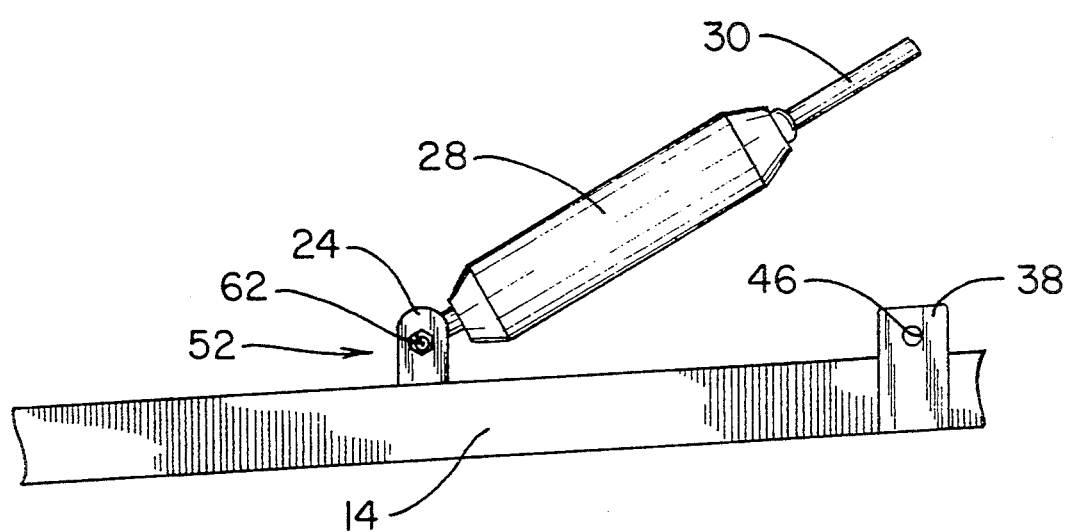
FIG. 2 is an enlarged partial side view of the embodiment of the invention shown in FIG. 1 wherein the trailer is in a tilted orientation.
Figure 4:
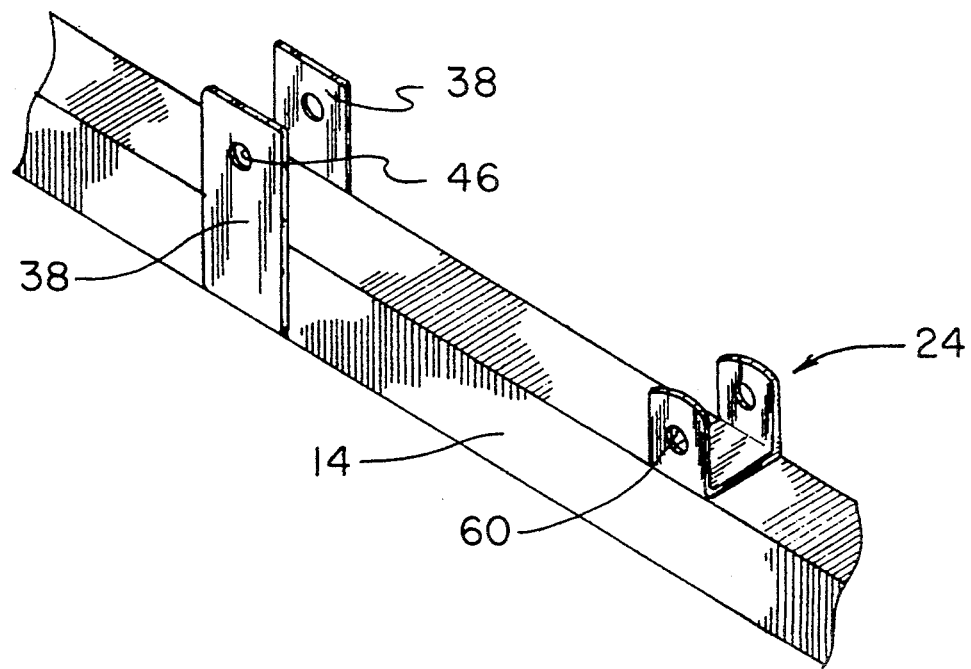
FIG. 4 is a perspective view of a portion of the trailer frame structure that is equipped with support brackets for supporting the embodiment of the invention shown in FIGS. 1-3.
Figure 5:
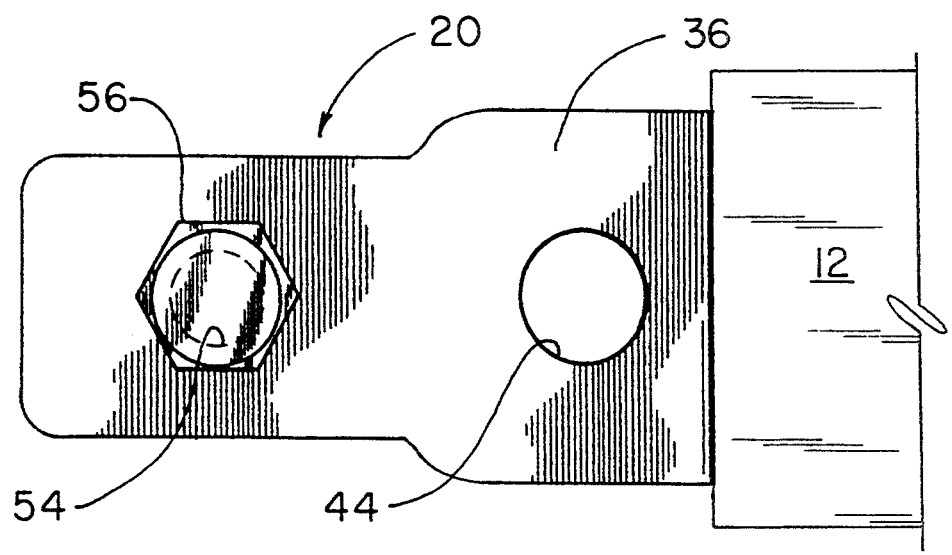
FIG. 5 is an enlarged side view of the portion of the embodiment of the invention shown in FIG. 3 that is in the circled region 5 in FIG. 3.
Figure 6:
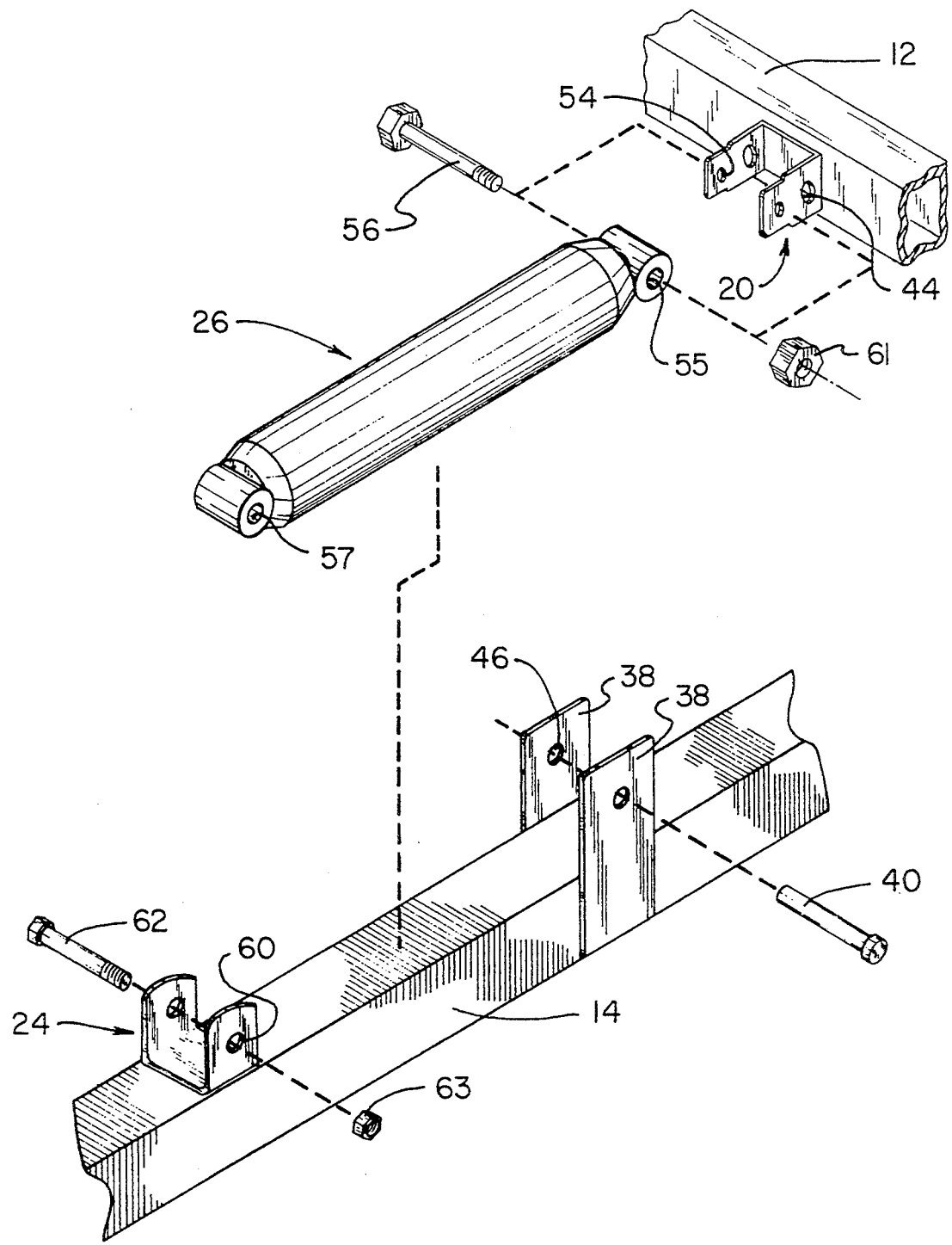
FIG. 6 is an enlarged exploded view of the embodiment of the invention shown in FIG. 3 with the trailer in a horizontal orientation.

Turning to FIGS. 1-6, there is shown an exemplary embodiment of the tilt trailer stabilizer apparatus of the invention generally designated by reference numeral 10. In its preferred form, tilt trailer stabilizer apparatus 10 is provided for a tilt trailer assembly which includes a tiltable bed assembly 12 which is capable of being placed in a horizontal orientation or in a tilted orientation. The tilt trailer assembly also includes a frame assembly 14 that supports the tiltable bed assembly 12. The tilt trailer stabilizer apparatus includes a first bracket assembly 20 which is connected to a first edge 22 of the tiltable bed assembly 12. A second bracket assembly 24 is connected to the frame assembly 14. A brake assembly 26 is connected between the first bracket assembly 20 and the second bracket assembly 24 for slowing relative motion between the tiltable bed assembly 12 and the frame assembly 14 when the tiltable bed assembly 12 is moved from a horizontal orientation to a tilted orientation and for slowing relative motion between the tiltable bed assembly 12 and the frame assembly 14 when the tiltable bed assembly 12 is moved from a tilted orientation to a horizontal orientation.

The first bracket assembly 20 includes a first hinge assembly 50 for connecting to a first end of the brake assembly 26, and the second bracket assembly 24 includes a second hinge assembly 52 for connecting to a second end of the brake assembly 26. The first hinge assembly 50 includes a pair of first hinge apertures 54 and a first hinge pin 56. The first hinge pin 56 is placed in registration with the first hinge apertures 54 and a first aperture 55 on the brake assembly 26 for providing a first hinged connection between the first bracket assembly 20 and the first end of the brake assembly 26. A nut 61 secures the first hinge pin 56 to the first bracket assembly 20.

The second hinge assembly 52 includes a pair of second hinge apertures 60 and a second hinge pin 62. The second hinge pin 62 is placed in registration with the second hinge apertures 60 and a second aperture 57 on the brake assembly 26 for providing a second hinged connection between the second bracket assembly 24 and the second end of the brake assembly 26. A nut 63 secures the second hinge pin 62 to the second bracket assembly 24.

The brake assembly 26 includes a fluid-based, motion damping assembly 26. The fluid-based, motion damping assembly 26 can be a conventional automobile shock absorber which includes a housing 28. A quantity of a fluid contained within the housing 28. A fluid flow restrictor (such as a piston) contained within the housing 28, and a piston rod 30 is connected to the piston.

A lock assembly is provided for locking the tiltable bed assembly 12 to the frame assembly 14 when the tiltable bed assembly 12 is in a horizontal orientation. The lock assembly includes a first lock member 36 connected to the tiltable bed assembly 12. A second lock member 38 is connected to the frame assembly 14, such that the first lock member 36 is placed in registration with the second lock member 38 when the tiltable bed assembly 12 is in a horizontal orientation. A lock pin 40 is provided for securing the first lock member 36 to the second lock member 38 when the first lock member 36 and the second lock member 38 are placed in registration.

The first lock member 36 is located on the first bracket assembly 20, and the first bracket assembly 20 is nested between a pair of second lock members 38 supported by the frame assembly 14 when the tiltable bed assembly 12 is in a horizontal orientation. The first lock member 36 includes a pair of first apertures 44 located on the first bracket assembly 20. The second lock member 38 includes a pair of second apertures 46 that are placed in registration with the first apertures 44 when the tiltable bed assembly 12 is in a horizontal orientation. The lock pin 40 is positioned through the first apertures 44 and the second apertures 46 when the tiltable bed assembly 12 is in a horizontal orientation, whereby the tiltable bed assembly 12 is locked in the horizontal orientation.

The components of the tilt trailer stabilizer apparatus of the invention can be made from inexpensive and durable metal and plastic materials. The brake assembly 26 can be a common automobile shock absorber. The size and shock absorbing capacity of the shock absorber can be selected based on the expected weight of the machinery to be carded by the trailer and on the weight of the tiltable bed assembly 12 of the trailer. The first bracket assembly 20 and the second bracket assembly 24 can be readily available brackets easily obtained in a hardware store. The brackets can be secured to the tiltable bed assembly 12 and the frame assembly 14 by nuts and bolts or by welding. The hinge assemblies include apertures in the brackets and bolts serving as hinge pins.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tilt trailer stabilizer apparatus that is low in cost, relatively simple in design and operation, and which may advantageously be used to prevent a rapid slamming of a trailer bed when it moves from a tilted to a horizontal position. With the invention, a tilt trailer stabilizer apparatus is provided which prevents a rapid slamming of a trailer bed when it moves from a horizontal to a tilted position. With the invention, a tilt trailer stabilizer apparatus is provided which facilitates retrofitting of present tilting utility trailers with devices for eliminating rapid slamming. With the invention, a tilt trailer stabilizer apparatus is provided which employs devices for retrofitting small utility trailers which are readily available and relatively inexpensive. With the invention, a tilt trailer stabilizer apparatus is provided which eliminates rapid trailer bed slamming without using hydraulically powered devices. With the invention, a tilt trailer stabilizer apparatus is provided which prevents rapid trailer bed slamming and permits a single person to load and unload a trailer.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved tilt trailer stabilizer apparatus for a tilt trailer assembly which includes a tiltable bed assembly which is capable of being placed in a horizontal orientation or in a tilted orientation and which includes a frame assembly that supports the tiltable bed assembly, said tilt trailer stabilizer apparatus comprising:

a first bracket assembly connected to a first edge of the tiltable bed assembly, a second bracket assembly connected to the frame assembly, a brake assembly connected between said first bracket assembly and said second bracket assembly for slowing relative motion between the tiltable bed assembly and the frame assembly when the tiltable bed assembly is moved from a horizontal orientation to a tilted orientation and for slowing relative motion between the tiltable bed assembly and the frame assembly when the tiltable bed assembly is moved from a tilted orientation to a horizontal orientation, wherein said brake assembly includes a fluid-based, motion damping assembly, and a lock assembly for locking the tiltable bed assembly to the frame assembly when the tiltable bed assembly is in a horizontal orientation, wherein said lock assembly includes a first lock member connected to the tiltable bed assembly and is located on said first bracket assembly, a second lock member connected to the frame assembly, such that said first lock member is placed in registration with said second lock member when the tiltable bed assembly is in a horizontal orientation, and a lock pin for securing said first lock member to said second lock member when said first lock member and said second lock member are placed in registration, wherein said first bracket assembly includes a first hinge assembly for connecting to a first end of said brake assembly, and said second bracket assembly includes a second hinge assembly for connecting to a second end of said brake assembly.

2. The apparatus described in claim 1 wherein said first hinge assembly includes a pair of first hinge apertures and a first hinge pin.

3. The apparatus described in claim 1 wherein said second hinge assembly includes a pair of second hinge apertures and a second hinge pin.

4. The apparatus described in claim 1 wherein:

said first lock member includes a pair of first apertures located on said first bracket assembly, said second lock member includes a pair of second apertures that are placed in registration with said first apertures when the tiltable bed assembly is in a horizontal orientation, and said lock pin is positioned through said first apertures and said second apertures when the tiltable bed assembly is in a horizontal orientation, whereby the tiltable bed assembly is locked in the horizontal orientation.

* * * * *